United States Patent Office 3,301,343
Patented Jan. 31, 1967

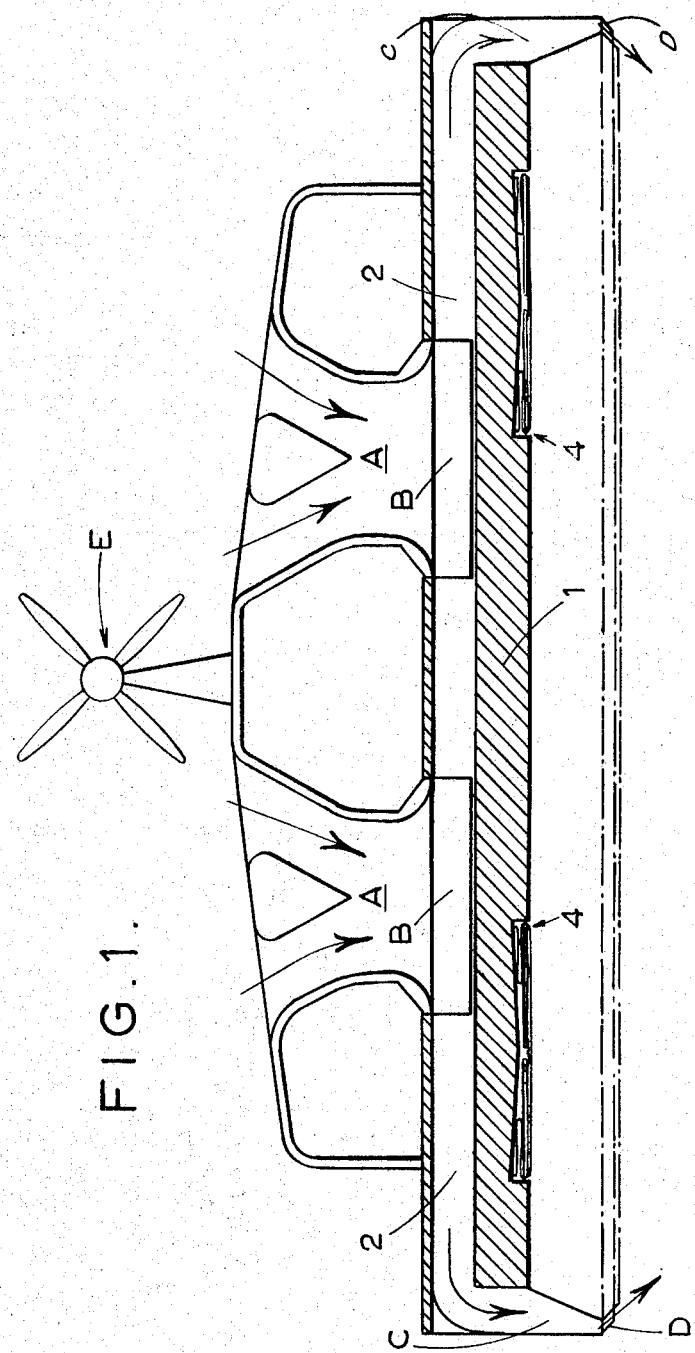

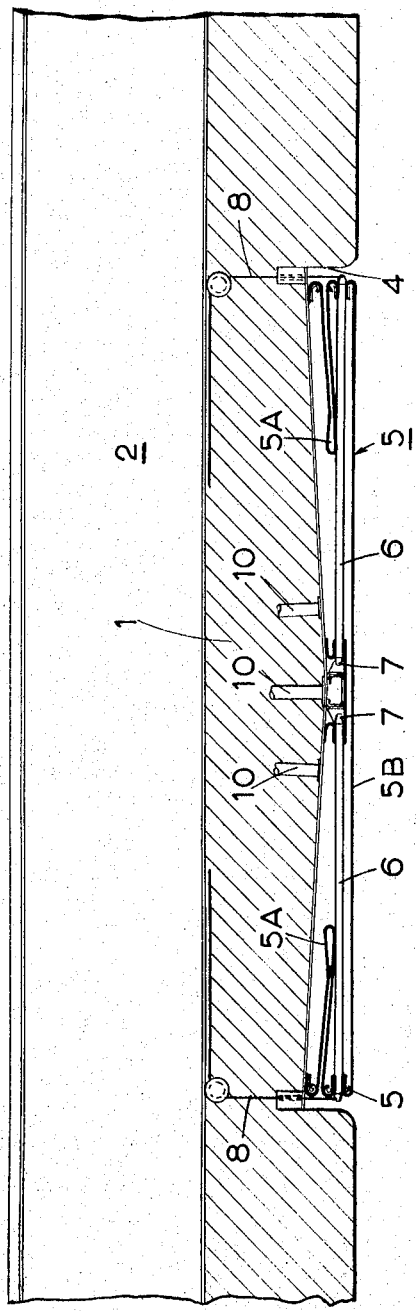
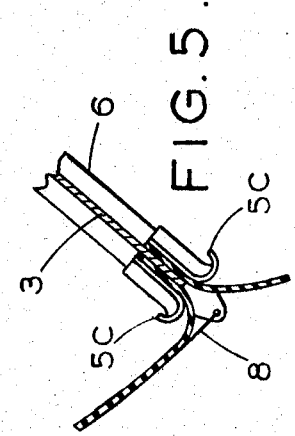
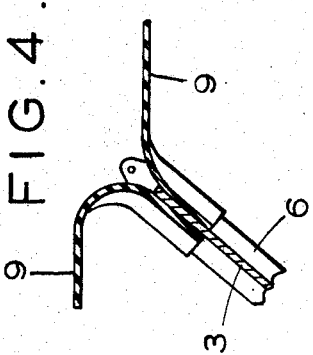

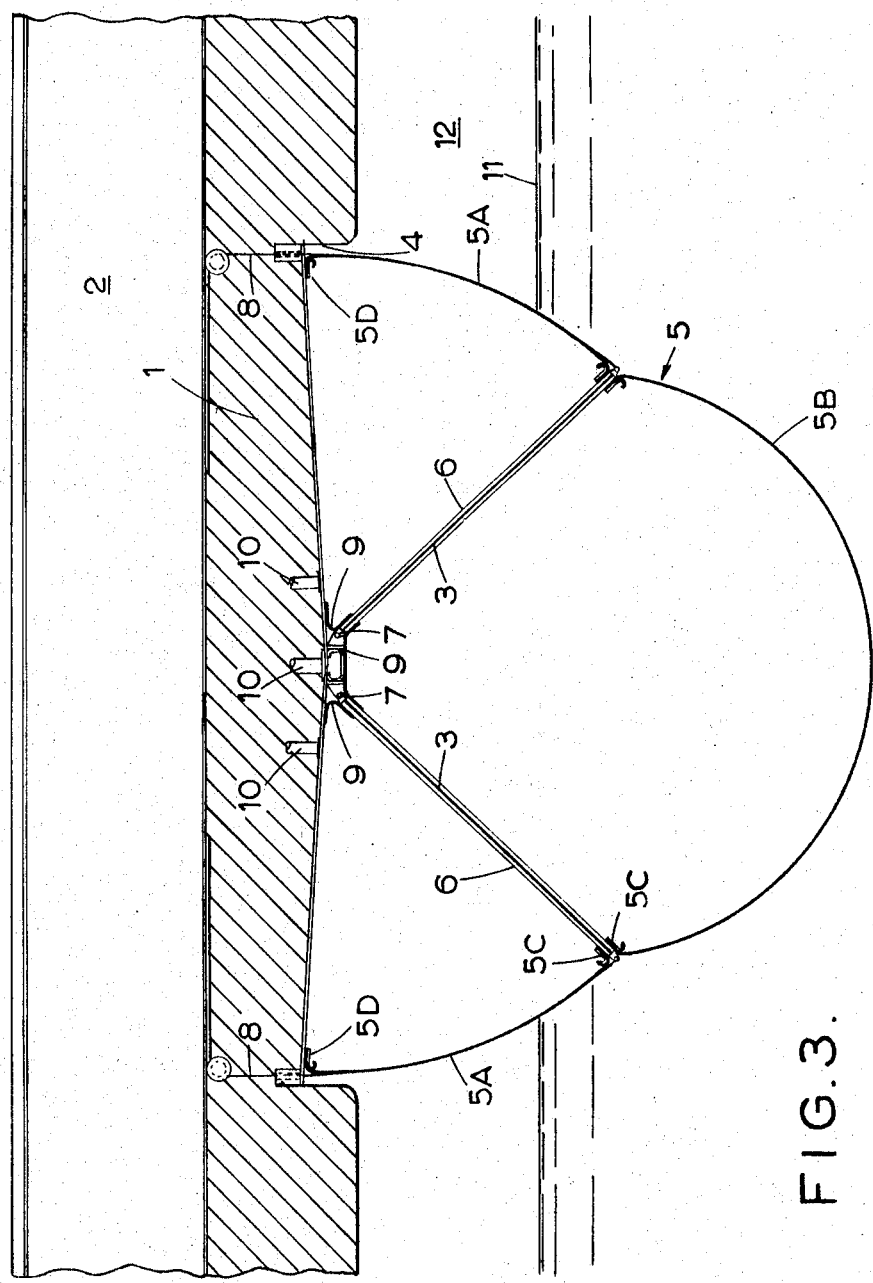

3,301,343
INFLATABLE BUOYANCY CHAMBERS WITH
VEHICLES EQUIPPED THEREWITH
Derek James Hardy, Cowes, and Michael Thomas Smith,
East Cowes, England, assignors to Westland Aircraft
Limited, Somerset, England
Filed July 2, 1964, Ser. No. 379,848
Claims priority, application Great Britain, July 27, 1963,
29,881/63
7 Claims. (Cl. 180—7)

This invention relates to inflatable buoyancy chambers. It is principally concerned with such chambers in application to ground effect vehicles, in which application it may serve the dual purpose of affording buoyancy and keel effect, and acting as a so-called skirt. The invention may, however, be applied to boats, pontoons or catamarans, for providing additional or total buoyancy, or for raising the general freeboard, or for providing a "retractable" keel effect. The invention may also be applied to sponsons of flying-boat or other hulls. It is also concerned to provide improvements in ground effect vehicles, in that it may be used to provide more efficient displacement running with adequate seakeeping properties, manoeuvrability, and directional control when afloat, whilst providing means capable of resting on the ground with minimum height for loading, servicing, or overhaul.

According to the invention, a pliable buoyancy chamber, defined over at least a major portion of its surface by a pliable skin, is furnished with apertures through which gas may be admitted into the chamber, to inflate the skin and sucked out of the chamber, to cause the skin to collapse, and a collapsible linkage inside the chamber which governs the folding of the skin in collapsing so as to provide a flat collapsed pack. Preferably the buoyancy chamber may be constructed so that it presents lobes in cross-section, the lobes including a central lobe having a pliable skin which covers the skins of the other lobes when the chamber is in the collapsed condition, the skins of the other lobes being folded beneath the skin of the central lobe. Preferably there are three lobes, and these may be divided from one another by pivoted struts constituting the said linkage. Mechanical means may be provided to actuate this strut system for collapsing. The chamber is also, preferably of elongated form having a length to beam relation such that it has hull-like properties when supporting an air cushion vehicle without the air cushion. The chamber may also have keel-like properties.

The aforesaid mechanical strut actuation, in one form of the invention, comprises cables which are outside the skin and attached at strut ends. Tensioning the cables pulls in the struts, causing the linkage to collapse. Alternatively, the inner strut ends are fixed to torsion bars which run lengthwise of the chamber, rotation of which bars actuates the struts.

Preferably the area of the skin of the aforesaid central lobe is of such width that, when flattened in the collapsed state, it substantially corresponds in plan-form and dimensions to the plan-form of a well which houses the collapsed pack. In this condition, this flat surface can be arranged so as to be approximately in the plane of the rigid bottom of the vehicle. The ends of the buoyancy chamber may, with advantage, be tapered in section, and then the strut system at the ends, being of the same nature as that in the main length of the chamber between its ends, is diminished in proportion to the diminishing cross-sectional dimensions of the chamber.

In a ground effect vehicle, there are preferably two such chambers, extending lengthwise (fore and aft) of the vehicle, each with a well in the otherwise flat rigid bottom. These when fully extended by inflation, are of such volume as to sustain the whole weight of the vehicle, with its bottom out of the water, by their buoyancy. They act also as twin keels.

It will be appreciated also that the inflatable chambers may provide part or all of the subdividing keels which, on a ground effect vehicle with peripheral skirts, are used to split the cushion into a number of compartments, in order to provide cushionborne stability.

In order that the invention may be clearly understood and readily carried into effect, one construction in accordance therewith will now be described, by way of example, with reference to the accompanying drawings, in which:

FIGURE 1 is a cross-section athwart an air cushion vehicle;
FIGURES 2 and 3 are cross-sections, on an enlarged scale, showing a mechanism forming part of the vehicle of FIGURE 1 when on two different phases in its operation, and
FIGURES 4 and 5 show details on a yet larger scale.

The example refers to the case of a twin-keeled flat-bottomed ground effect vehicle having a rigid bottom structure 1. Above this there is a hollow space forming a plenum chamber 2 fed through vertical ducts A by fans B beneath the ducts A. The air is discharged from the plenum chamber 2 through a peripheral duct C, whence it is delivered through a flexible peripheral nozzle D inclined towards the centre of the vehicle to provide the air cushion. The vehicle is propelled by one or more air propellers E. Parts of the bottom structure 1 may be constituted as permanent buoyancy chambers. In the bottom structure 1 are two longitudinal wells 4. Associated with each well is a buoyancy chamber. This comprises a pliable impervious skin 5, arranged to inflate into two side lobes 5A, and a bottom lobe 5B. Within the chamber, there are arranged struts which are, preferably, longitudinally extending webs 3, e.g. of sheet material, with localised reinforcing tubes 6. These tubes 6 are pivotally attached at 7 to the bottom structure 1, for lateral swinging. At their outer ends, the struts are attached to the skin 5 by clamps 5C, which seal the adjacent edges of the lobes 5A, 5B, to the webs 3 and tubes 6. Clamps 5D seal the edges of the lobes 5A to the bottom structure 1. These clamps enable the skin to be made in panels, which facilitates manufacture and damage replacement. To the outer ends of the tubes 6 are attached (externally of the skin) cables 8, passing through the bottom structure 1 and leading to any suitable winding device (not shown). The inner ends of the tubes 6, and webs 3, are sealed to the bottom structure 1 by pliable sealing strips 9.

To the interior of the skin are led air pipes 10. These lead to each compartment of the chamber, corresponding to the lobes. The same or similar pipes are used for sucking air out of the chamber.

A feature of the invention resides in this, that the dimensions of the skin of the bottom lobe 5B are such that, when the chamber is collapsed or retracted (see FIGURES 1 and 2) the skins 5A of the side lobes are folded beneath the panel or area constituting this lobe, which fits as snugly as is practicable into the well 4. Then the "pack" formed by the collapsed chamber not only occupies the well, but presents a flat surface which is substantially a continuum of the flat underside of the bottom structure 1. The air suction ensures that the lobes 5A fold inwards instead of bulging outwards when the chamber is retracted.

Assuming the cables to be free to run out, the chamber is inflated via the pipes 10 and extends to the condition of FIGURE 3 with an internal pressure of about ten pounds per square inch. In this condition, buoyancy is such that the waterline of the vehicle will be about as shown at 11 (FIGURE 3). The vehicle is now such that it is a twin-hulled buoyancy craft, with adequate keel length and area for water operations as a displacement craft. The chambers shown in the drawings are approximately fourteen feet wide and nine feet deep. Their length is such as to provide buoyancy for a vehicle of two hundred tons all up weight.

The arrangement of the struts may be considerably varied. They may be knuckle-jointed, or comprise a lazy-tongs arrangement. Instead of the cables 8, the inner ends (at 7) may be attached to longitudinal torsion bars, rotation of which swings the struts, and these may be operated by jacks or the like contained within the chamber.

It will be noted that in the preferred embodiment, the bottom lobe never has to fold in creases, and although the side lobes do so fold (FIGURE 2) the creases are not pressed very flat, and thus do not tend to form lines of weakness. The material used for the skin may be rubberized fabric such as woven nylon.

Whilst the example shows three lobes, there may be a greater number, but preferably the lobe area of the bottom of the chamber has, as a whole, the dimentional character above described.

We claim as our invention:

1. A pliable buoyancy chamber defined over at least a major portion of its surface by a pliable skin and furnished with apertures through which gas may be admitted into the chamber to inflate the skin and sucked out of the chamber to cause the skin to collapse, and a collapsible rigid linkage assembly inside the chamber for folding into a substantially flat plane very close to a wall forming part of the boundary of the chamber and for governing the folding of the skin in collapsing so as to provide a flat collapsed pack when deflated, said buoyancy chamber when inflated presenting lobes in cross-section, the lobes including a central lobe having a pliable skin which covers the skins of the other lobes when the chamber is in the collapsed condition, the skins of the other lobes then being folded beneath the skin of the central lobe.

2. A buoyancy chamber according to claim 1 wherein said collapsible linkage comprises struts pivoted centrally to the said wall and dividing the lobes.

3. A buoyancy chamber according to claim 2 further comprising mechanical means for causing the linkage to collapse, in which the mechanical means comprise cables attached to the ends of the struts, and extending outside the skin to a location at which tension can be applied to the cables to cause them to swing the struts towards the said wall.

4. In a ground effect vehicle of the type which travels on or over water during at least part of its operation, means defining a rigid base structure, an inflatable buoyancy chamber connected to said base structure to extend downwardly therefrom when inflated, said buoyancy chamber being formed of a pliable fabric-like material connected along opposing sides to said base structure so as to depend downwardly therefrom with a curved cross-sectional configuration when inflated, and linkage means inside the chamber for governing the folding of the material into a substantially flat pack upon deflation, said linkage means comprising two opposed struts pivotally connected to said base structure for pivotal movement generally in the cross-sectional plane, said struts being connected at their outer ends to said material at points spaced from each other, the length of material between said spaced points being substantially equal to the distance between the outer ends of said struts when said struts are pivoted upwardly against said base structure.

5. In a ground effect vehicle of the type which travels on or over water during at least part of its operation, means defining a rigid base structure, an inflatable buoyancy chamber connected to said base structure to extend downwardly therefrom when inflated, said buoyancy chamber being formed of a pliable fabric-like material connected along opposing sides to said base structure so as to depend downwardly therefrom with a curved cross-sectional configuration when inflated, and means inside the chamber connected to said base structure and to two spaced points along the material for constraining these points to move toward each other so as to form the material between said points into a lower curved lobe when the chamber is inflated and for constraining said points to move away from each other and upwardly so as to form the material therebetween into a substantially flat bottom cover when said chamber is deflated.

6. Apparatus as set forth in claim 5 wherein said means inside the chamber comprise at least two struts each pivotally connected at one end to said base structure and at the other end to said material at one of said points, further comprising means for pivoting said struts about their pivotal connections during deflation or inflation of said chamber.

7. Apparatus as set forth in claim 6 further comprising means extending along said struts for dividing said chamber into distinct subchambers.

References Cited by the Examiner

UNITED STATES PATENTS

| 3,004,737 | 10/1961 | Boyle et al. | 244—105 X |
| 3,137,262 | 6/1964 | Tibbetts et al. | 180—7 |
| 3,168,069 | 2/1965 | Everest et al. | 180—7 |

FOREIGN PATENTS 264,635  1/1929  Italy.

BENJAMIN HERSH, *Primary Examiner.*

M. S. SALES, *Assistant Examiner.*